United States Patent Office 2,800,102
Patented July 23, 1957

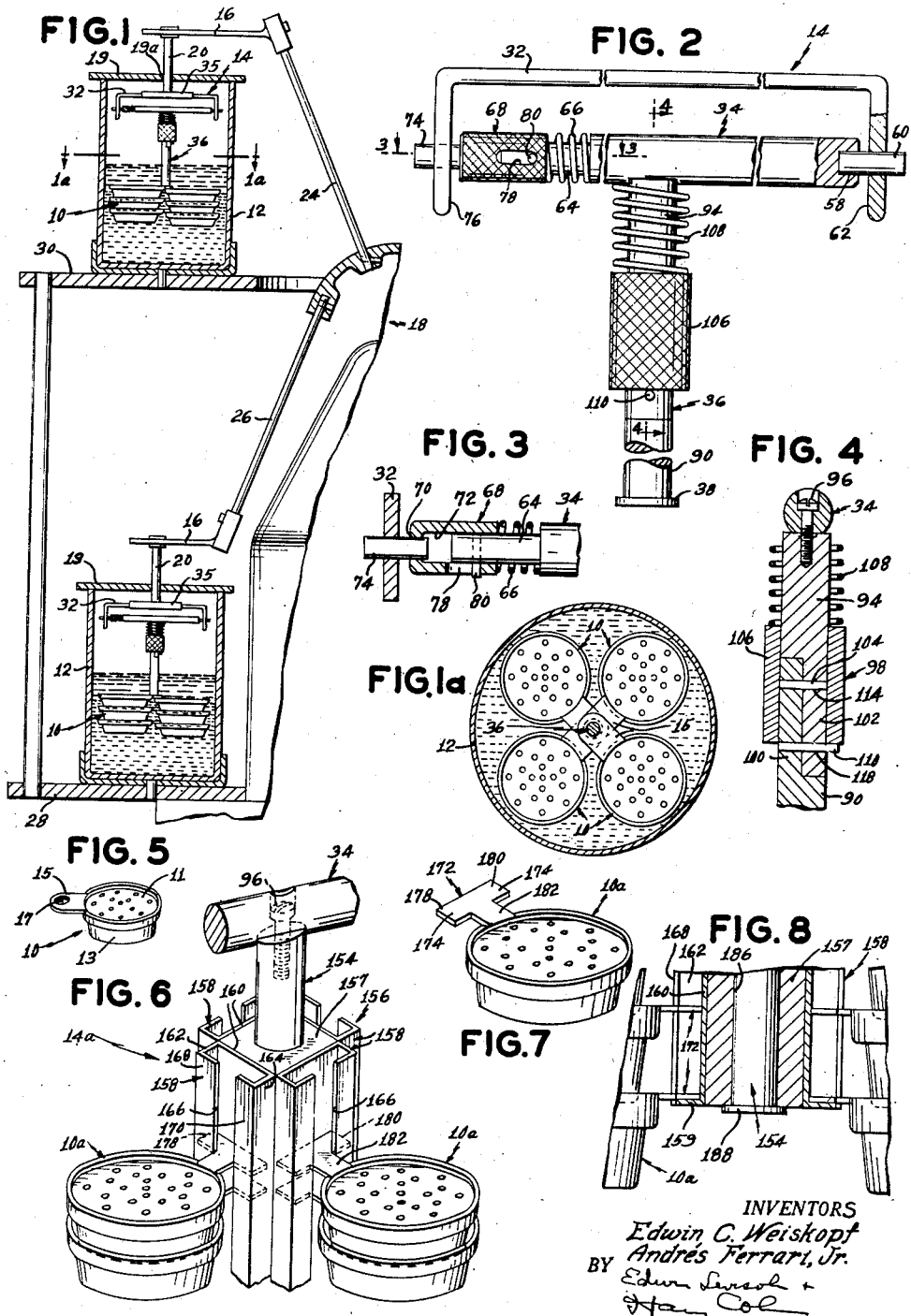

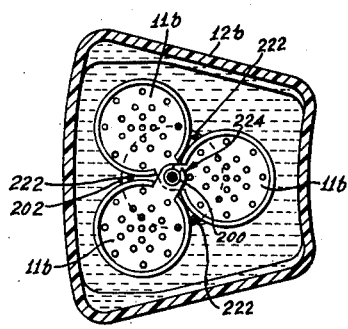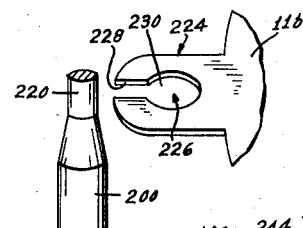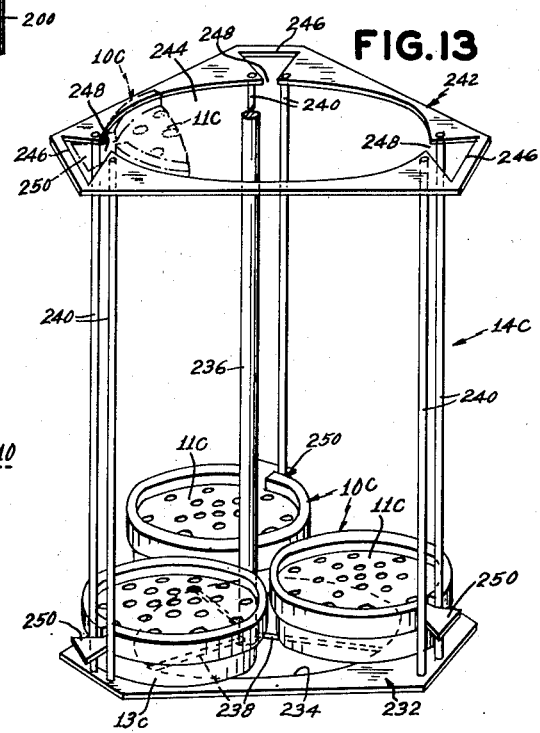

2,800,102

RECEPTACLE CARRIER FOR TISSUE PROCESSING

Edwin C. Weiskopf, Brewster, and Andres Ferrari, Jr., New Rochelle, N. Y., assignors to Technicon International, Ltd., New York, N. Y., a corporation of New York Application December 9, 1954, Serial No. 474,218

29 Claims. (Cl. 118—425)

This invention relates to automatic immersion apparatus and more particularly to means for releasably supporting a material holder, or a plurality of material holders on the conveyor of such apparatus.

Automatic immersion apparatus of the type to which the present invention relates is shown in our U. S. patent application Serial No. 358,812, filed June 1, 1953, now Patent No. 2,741,221, issued April 10, 1956.

The present invention may also be used with automatic immersion apparatus of the type shown in U. S. Patent Nos. 2,341,197 and 2,341,198, issued on February 8, 1944, to Edwin C. Weiskopf, a joint inventor herein, and in U. S. Patent No. 2,583,379, issued on January 22, 1952, to Nelson G. Kling. Said application and patents are all owned by the assignee of this application.

In the operation of the automatic immersion apparatus of the character disclosed in said application and patents, a basket for a plurality of material holders is moved into and out of each of a plurality of receptacles, in succession, with intervening intervals during which the material holders are positioned within the receptacles, respectively, for subjecting the material such as human or animal tissue to the action of various processing liquids provided in each of said receptacles, and provision is made for reciprocating, turning or rotating the material while in the receptacles in order to improve the action of the liquids on the material.

One object of the present invention is to provide an improved carrier for the material holders especially of the type disclosed and claimed in United States patent application Serial No. 474,244 of Edwin C. Whitehead, filed concurrently herewith, and assigned to the assignee of this application.

Another object of the present invention is to provide an improved carrier for the material holders constructed and arranged to enable the material holders to be readily attached to and removed from the carrier when desired.

Another object is the provision of a novel carrier suitable for carrying a plurality of material holders in such manner as to afford proper access of the processing liquid to the tissue or other material in said holders.

Another object is to provide an improved carrier for the material holder for rotating, turning or for vertically reciprocating the latter in the processing liquid in the receptacle.

The above objects of the invention and other objects ancillary thereto will be fully understood from the following description considered in connection with the accompanying drawings, which are to be considered as illustrative of the invention but not in limitation thereof.

In the drawings:

Fig. 1 is a vertical sectional view, partly in elevation of a portion of immersion apparatus provided with material-holder carriers embodying one form of the invention;

Fig. 1a is a sectional view on the line 1a—1a of Fig. 1;

Fig. 2 is a side view of the carrier shown in Fig. 1;

Fig. 3 is a detail sectional view taken on line 3—3 of Fig. 2;

Fig. 4 is a sectional view taken on line 4—4 of Fig. 2;

Fig. 5 is a perspective view of a material holder having a complementary portion adapted for engagement with the carrier illustrated in Fig. 2;

Fig. 6 is a perspective view of a material-holder and carrier showing another embodiment of the invention;

Fig. 7 is a material holder of the form shown in Fig. 6;

Fig. 8 is a view, partly in elevation and partly in section of the bottom portion of the carrier and holders shown in Fig. 6;

Fig. 9 is an enlarged sectional view partly in elevation, similar to Fig. 1, illustrating the presently preferred form of this invention;

Fig. 10 is a sectional view taken along the line 10—10 of Fig. 9;

Fig. 11 is a fragmentary perspective view illustrating the manner in which the material holders are attachable to and removable from the carrier shown in Fig. 9;

Fig. 12 is a fragmentary top plan view of automatic immersion apparatus provided with the material holder carrier shown in Fig. 9;

Fig. 13 is a perspective view of a modified form of carrier embodying the present invention; and Fig. 14 is a perspective view of another form of the present invention.

Referring now to the drawings in detail, Fig. 1 illustrates a plurality of material holders generally indicated at 10, positioned in both the liquid receptacles 12. Said holders are preferably, but not necessarily, of the type disclosed in the co-pending application of Edwin C. Whitehead, Serial No. 423,186. Briefly described, said material holders 10 are small containers which are provided with removable covers 11. The receptacle-body 13 of the container has a perforated bottom and the cover 11 is also preferably perforated so that the liquid in receptacle 12 can readily pass into and out of the container for treating the tissue or other material therein. Furthermore, as fully described and claimed in said Whitehead application, Serial No. 423,186, the inner surface 19 of the cover is preferably formed of a fibrous porous material such as blotting paper to which tissue will adhere with out the need of any adhesive. The body 13 of the container is provided with an ear or extension 15 having an aperture 17 for mounting the holder 10 on the carrier 14.

The carrier 14 is connected to the arm 16 of the conveyor of the immersion apparatus 18 by means of spindles 20. Said arm 16 is connected to the conveyor 18 by arm 24 for the receptacles on the upper receptacle support 30 of the apparatus and by an arm 26 for the receptacles on the lower support 28 of the apparatus. This immersion apparatus is shown and described in detail in the above mentioned United States Patent 2,583,379 and in our above mentioned United States Patent No. 2,741,221. As described in said patent and application, the conveyor is operable to move the material holder into and out of a plurality of receptacles 12 in succession and as described in said application said conveyor is also operable to repeatedly reciprocate the tissue holder in the liquid each receptacle during the period of treatment. As this apparatus itself is not per se part of the present invention, further description thereof is considered unnecessary. Also, it will be understood that the apparatus may be of other constructions, although the apparatus which is provided with means for reciprocating the tissue while the later is in the receptacle 12 is preferred. Also, it will be understood that the apparatus may have only one receptacle support, for example, as in U. S. Patent No. 2,341,198. The cover 13 for the receptacle in which the material holders are positioned for treatment is automatically raised up from the top of the receptacle when the material holders are raised out of the receptacle and is lowered onto the next receptacle when the material holders are lowered into the latter, as hereinafter described.

Referring now more particularly to Figs. 2–5, which illustrates one mode of practicing our invention, the carrier 14 includes a substantially U-shaped member 32 for supporting a cross-bar 34 substantially transversely to spindle 20. Cross-bar 34 carries a vertical rod 36 having a flange 38 at its lower end. Member 32 is supported by member 35 which is carried by spindle 20. The holders 10 are mounted on this rod which projects through the apertures 17 in the ears of said holders. Said holders may be arranged in a plurality of stacks disposed laterally of each other as illustrated in Figs. 1 and 1a. Flange 38 supports the lowermost material holder and the others are stacked with their ears disposed one above the other on rod 36.

Cross-bar 34 is provided at one end with an aperture 58 for engagement with pin 60 which is secured in end portion 62 of U-shaped member 32. The other end of cross-bar 34 is provided with a portion of reduced diameter 64, as best seen in Figs. 2 and 3, upon which is provided a compression spring 66. A knurled member or sleeve 68 is provided having an aperture 70 at one end thereof. Said sleeve 68 is also provided with an internal bore 72 of a diameter substantially equal to the diameter of reduced portion 64 of cross-bar 34, whereby to permit knurled member 68 to be engaged with and longitudinally movable along reduced portion 64 of cross-bar 34. Aperture 70 is adapted for engagement with pin 74, which is secured to end portion 76 of U-shaped member 32. In order to facilitate the removal of cross-bar 34 from the end portions 62 and 76 of U-shaped member 32, knurled member 68 can be moved longitudinally along reduced portion 64 of cross-bar 34 against the pressure of spring 66, whereby pin 74 can be readily disengaged from aperture 70; and, in order to prevent knurled member 68 from becoming inadvertently disengaged from reduced portion 64, knurled member 68 is provided with a longitudinally extending slot 78 and reduced portion 64 of cross-bar 34 is provided with a transversely extending pin 80 which extends through slot 78, both of which conjointly limit the extent of longitudinal movement of knurled member 68.

The spindle 36 includes two separable parts, a lower member or part 90 which is provided with the above mentioned flange or shoulder 38 and an upper member or part 94 which is suitably secured to cross bar 34 for example and not by way of limitation, by means of a screw 96. Said parts 90 and 94 are releasably coupled together by means of coupling means 98. Said parts 90 and 94 have longitudinally extending semi-cylindrical portions 100 and 102 which, when coupled together by the coupling means 98 form substantially a cylindrical member. Coupling means 98 includes a pin 104, or other suitable means, for effectively joining portions 90 and 94 by joining their respective semi-cylindrical portions 100 and 102, a knurled spindle locking sleeve or member 106 whose lateral movement along portion 94 and 90 is effectively limited at one end by compression spring 108 and at the other end by stop pin 110, which is fixed to part 100 and projects through an opening 118 in part 102. Pin 104 is fixed to part 100 and engages part 102 in an opening 114. A spring 108 is interposed between the sleeves 106 and the cross bar 34 and holds the overlapped portions 102 and 100 releasably against inadvertent disengagement. When the material holders are raised out of the receptacle 12, member 32 lifts the cover 19 off the top of the receptacle and supports said cover while the carrier is moved to a position over the next receptacle. An opening 19a in the cover enables the latter to move in relation to spindle 20 when the holders are lowered into the next receptacle.

It will be understood that the material holders 10 are placed on and removed from the rod part 90 of the carrier 14 when said part 10 is disengaged from part 94.

Referring now to the carrier 14a according to the form of the invention illustrated in Figs. 6 to 8, the spindle or rod 36 is replaced by the rod 154 which is connected to the cross-bar 34 by the screw 96. Rod 154 supports a carrier 156 provided with vertical channels 158 arranged peripherally about rod 154.

Channels or tracks 158 are substantially rectangularly shaped having a rear wall 160 which is suitably secured to the side of member 157 which is supported on said rod and two substantially parallel projecting sides 162 and 164. The remaining side of track 158 has a longitudinal slot 166 therethrough whereby two lip portions 168 and 170 project substantially parallel to side 160 from sides 162 and 164, respectively. The bottom of track 158 is suitably closed by means of a plate 159 and is opened at the top in order to facilitate insertion of a complementary laterally-enlarged end portion 172 of ear 174 provided on receptacle holder 10a. Holders 10a may be the same as holders 10 except that ears 174 of holders 10a have the laterally enlarged portion 172 in lieu of the apertures 17 of holders 10.

When ear 174 is inserted in track 158, the end portion 172 is engaged with side 160 of the track, and the shorter sides 178 and 180 of portion 172 are engaged with sides 162 and 164, respectively, of the track 158, end portion 182 projects through slot 166 of track 158. Flange portion 172 and track 158 are effective for the imparting to holders 10a reciprocating motion of the immersion apparatus when said flange 172 and track 158 are engaged. The manner in which cross-bar 34 is connected to U-shaped member 32 is exactly the same whether supporting spindle 154 is provided with tracks or whether supporting spindle 36 is constructed so as to have two portions readily attachable and detachable from each other.

Member 157 is provided with an aperture 186 through which spindle portion 154 passes for positioning thereon tracks 158. Provided on one end of spindle portion 154 is an internal thread for engagement with screw 96 whereby to couple spindle portion 154 to cross-bar 34. Provided on the other end of supporting spindle 154 is an enlarged portion or flange 188 of a diameter greater than the diameter of the aperture 186 provided in block 156 whereby to retain carrier 156 on the supporting spindle 154.

It will be understood that the carrier 14 or 14a may be utilized in immersion apparatus in which the material is turned as in U. S. Patents 2,341,197 and 2,341,198 or oscillated as U. S. Patent 2,583,379, or reciprocated vertically as in our U. S. Patent No. 2,741,221. It will be noted that when the carriers 14 or 14a are used in apparatus which provides for vertical reciprocation of the tissue in the material holders 10 or 10a, the holders are advantageously movable longitudinally of the rods 36 or 154 so that the circulation of liquid through the holders in contact with the tissue specimens therein is to some extent probably improved by such movement.

The presently preferred embodiment of this invention is shown in Figures 9, 10 and 11 of the drawings. The carrier 14b shown therein includes a vertically extending rod 200 being provided at the bottom thereof with a laterally extending flange or plate 202. Disposed at the top of rod 200 are a pair of arms 204 and 206 which are disposed at right angles to each other to fit into a slot 208 and a groove 210, respectively, which are similarly at right angles in a conveyor 214 of an automatic immersion machine (Figs. 9 and 12). The carrier 14b is adapted to depend from the conveyor 214 and extend through a cover 218 mounted on a stud 216 which is secured to conveyor 214 for movement therewith. Cover 218 is provided with a slot 217 to provide for passage of carrier 14b to and from its connected position on the conveyor and said slot 217 is normally closed by a removable closure member 219. The means for mounting carrier 14b on conveyor 214 and the structure of cover 218 are more fully described and are claimed in U. S. patent application, Serial No. 474,210, filed by Jack Isreeli concurrently herewith and assigned to the assignee hereof. A more detailed description herein is considered unnecessary as this arrangement does not per se constitute part of our invention.

Vertical rod 200 is provided below cover 218 with a throat 220 having a substantially smaller diameter than the remainder of rod 200. Provided on flange 202 of carrier 14b are a plurality of indexing pins 222 which serve a purpose to be made more clear hereinafter. Carrier 14b is herein illustrated supporting material holders 10b which are substantially the same as those shown in the aforementioned Whitehead application, Serial No. 474,244, filed concurrently herewith. Said material holders include a main receptacle body 13b and a removable cover 11b. Holders 10b are substantially the same as the holders 10 and 10a heretofore described except that the main body portion 13b is not provided with the lateral extension but instead cover 11b is provided with a laterally extending portion or tab 224. In accordance with the present invention, laterally extending portion 224 of cover 11b is provided with a keyhole-shaped slot 226 having a narrow portion 228 adjacent the periphery of tab 224 and a large circular portion 230 in communication with narrow slot portion 228 but remote from the periphery of the tab. In order to position a tissue holder 10b on carrier 14b, the narrow portion 228 of slot 226 is registered with throat 220 of rod 200, as indicated for example by Fig. 11, and the tissue holder is moved laterally until wide circular portion 230 of slot 226 registers with the wide portion of rod 200. Thereafter, holder 10b can be moved downwardly until it engages flange 202 of carrier 14b at which point the holder comes to rest since wide slot portion 230 and rod 200 cooperate to prevent lateral movement of the material holder and flange 202 prevents further downward movement thereof. Subsequently, a plurality of other holders may be moved in a like manner onto carrier 14b and stacked one on top of the other on the lowermost holder.

Carrier 14b is arranged to hold three stacks of receptacles 10b disposed symmetrically around rod 200. Such an arrangement is particularly suitable for use in conjunction with the non-circular, converging-wall receptacle 12b illustrated in Fig. 10 and described in further detail and claimed in the aforementioned Isreeli application and in U. S. patent application, Serial No. 474,138, filed by Nelson G. Kling concurrently herewith and assigned to the assignee of the present invention. As described in detail in the aforementioned Isreeli and Kling applications, the receptacles 12b are highly desirable from the standpoint of increasing the capacity of an automatic immersion machine without increasing the size of the machine. However, with such a configuration for the receptacle, it is necessary for the material holders to be disposed in a particular disposition relative to the receptacles, which disposition is clearly illustrated in Fig. 10 of the drawings. Accordingly, the indexing pins 222 on flange 202 are arranged so that three holders 10b can be disposed on carrier 14b in engagement with flange 202 in a substantially triangular arrangement. It will be clear from Figs. 9 and 10 that indexing pins 222 are disposed in relation to the arms 204 and 206 and slot 208 and groove 210 in the conveyor 214 so that the base of the triangular arrangement registers with the wide part of receptacle 12b and the apex of the arrangement registers with the narrow part of the receptacle.

Referring now to Fig. 13, another form of carrier, generally designated by the reference character 14c, is illustrated. Said carrier comprises a lower triangular shaped horizontal member 232 provided with a relatively large central aperture 234. Member 232 is connected to and carried by a vertically extending member or rod 236 by means of radially extending members 238. The upper part of rod 236 may be provided with any suitable means (not shown) for connecting it to the conveyor of the automatic immersion machine. Extending upward from member 232 are a plurality of pairs of slender rods 240, here shown as three pairs, which support at their upper ends an upper horizontal triangular member 242. Member 242 has an enlarged central aperture 244, and is provided with dovetail shaped slots 246 which are disposed between each pair of rods 240 and which have their narrow ends in communication with central aperture 244 between said pairs of rods, as at 248.

Carrier 14c is adapted to support a plurality of holders 10c which are similar to holder 10b except that the covers 11c thereon are provided with dovetail shaped tabs 250. The narrow parts of tabs 250 are narrower than the distance between a pair of vertical rods 240 and the wide parts of the tabs are wider than the distance between the rods. Accordingly, a holder 10c can be positioned over upper lateral member 242 with tab 250 registering with a dovetail slot 246 and then moved downwardly with the narrow part of the dovetail tab between the associated pair of rods. With the holder so positioned, it is movable vertically but not laterally relative to the rods. To position the holder on the carrier for support thereby, it is moved downwardly until it engages member 232. Thereafter, a number of other holders can be placed on the carrier in a similar manner in stacked relation over the lowermost holder. In order to facilitate the placing of the holder on carrier 14c, dovetail slots 246 are preferably substantially larger than tabs 250.

It will be noted that carrier 14c is triangular in configuration and is adapted to carry three stacks of holders arranged in a triangle so as to adapt it for use in connection with the approximately triangular-shaped beakers 12b. Of course, carrier 14c can have other configurations for use with other types of beakers.

Figure 14 illustrates yet another embodiment of the present invention. In Fig. 14, the carrier 14d is a substantially triangular member having three channel members disposed thereon in much the same manner as the channel members are disposed on carrier 14a in Fig. 6. Material holders 10d are similar in construction to the construction of holders 10b and 10c except that covers 11d are provided with a T-shaped tab 252 suitable for interengagement with the channels 254 on carrier 14d. The manner in which the holders are positioned on carrier 14d is much the same as the manner already described with regard to carrier 14a and shown in Fig. 6, and, accordingly, it is believed that a detailed description of the manner of use of holder 14d is unnecessary. However, it will be noted that with the configuration of carrier 14d triangular, the holders 10d will be disposed in a substantially triangular configuration similar to the configuration of the holders on carrier 14b and, accordingly, the carrier with the holders stacked thereon can be inserted into a converging wall receptacle such as that designated as 12b in Fig. 10.

Although the embodiments shown and described with respect to Figs. 9 through 13 are all shown supporting material holders in which the laterally extending parts are formed on the covers for the holders, it will be obvious that the carriers 14b, 14c and 14d may be used with tissue holders similar to those shown and described in conjunction with Figs. 1 through 8 of the present application, which holders have laterally extending parts on the main body portions of the holders and not on the covers 11. Conversely, the carriers shown in Figs. 1 through 8 in the drawings can be employed with tissue holders in which the laterally extending parts are on the covers rather than on the main receptacle body portions. For example, but without limitation, tabs such as the tabs 224 on the covers for the tissue holders may be provided instead of additionally on the receptacle bodies 13b. Also, it will be understood that it is within the scope of the present invention to employ covers 11b, 11c and 11d without their associated receptacle bodies and to removably attach said covers with tissue specimens mounted thereon to their associated carriers.

The present application is a continuation in part of our U. S. patent application, Serial No. 423,187, filed April 14, 1954, and assigned to the assignee hereof.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a support from which said carrier depends, said carrier having an upper end portion for the mounting of said material holders on the carrier and the removal of said holders therefrom.

2. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a support from which said carrier depends, said carrier having separable parts and means for releasably securing them to each other, one of said parts being secured to said support and the other of said parts terminating in a free end when said parts are separated from each other, said free end providing for the mounting of said material holders on the carrier and the removal of said holders therefrom.

3. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a plurality of material holders releasably engageable with said carrier, each of said holders comprising a container provided with a lateral extension, said carrier and the lateral extensions of said holders having interengaging portions by which the holders are releasably secured to the carrier.

4. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a plurality of material holders releasably engageable with said carrier, each of said holders comprising a container provided with a lateral extension, said carrier comprising a vertical member and said extensions having openings through which said vertical member projects for releasably securing said holders to said carrier.

5. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a plurality of material holders releasably engageable with said carrier, each of said holders comprising a container provided with a lateral extension, said carrier comprising a vertical member provided with a vertical channel in which said extensions are movably received and by which the holders are releasably secured to said carrier with said containers projecting laterally from said channel.

6. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a plurality of material holders releasably engageable with said carrier, each of said holders comprising a container provided with a lateral extension, said carrier comprising a vertical member provided with a plurality of peripherally arranged vertical channels in each of which a plurality of the material holders may be secured in stacked relation, the extensions of said containers of the material holders being movably engageable in said channels and said containers projecting laterally from said channels, respectively.

7. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a support from which said carrier depends, said carrier having separable parts and means for releasably securing them to each other, one of said parts being secured to said support and the other of said parts terminating in a free end when said parts are separated from each other, said free end providing for the mounting of said material holders on the carrier and the removal of said holders therefrom, said means for releasably securing said parts to each other comprising a sleeve slidable on said parts to a retaining position and movable to a releasing position, and means for releasably holding said sleeve in said retaining position.

8. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a support from which said carrier depends, said carrier having said support comprising a first member having spaced confronting end portions, and a second member which is longitudinally expansible and contractable for releasable engagement at it opposite ends with said confronting end portions of said first member.

9. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a support from which said carrier depends, said carrier having said support comprising a first member having spaced confronting end portions, and a second member which is longitudinally expansible and contractable for releasable engagement at its opposite ends with said confronting end portions of said first member, and spring means acting on said second member to hold it in expanded condition.

10. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a support from which said carrier depends, said carrier having said support comprising a first member having spaced confronting end portions, and a second member which is longitudinally expansible and contractable for releasable engagement at its opposite ends with said confronting end portions of said first member, and means attached to said first member for lowering the carrier into said receptable and for raising said carrier out of said receptacle.

11. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a support from which said carrier depends, said carrier having said support comprising a first member having spaced confronting end portions, and a second member which is longitudinally expansible and contractable for releasable engagement at its opposite ends with said confronting end portion of said first member, and means attached to said first member for lowering the carrier into said receptacle and for raising said carrier out of said receptacle, and a cover for the receptacle carried by said support and automatically placed on the receptacle and removed therefrom when said carrier is lowered into the receptacle and raised out of the receptacle, respectively.

12. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a plurality of material holders releasably engageable with said carrier, each of said holders comprising a container provided with a lateral extension, said carrier comprising a vertical rod and said extensions on said holders having openings through which the rod projects for holding said holders laterally of said rod with a plurality of said material holders positioned laterally of each other about said rod.

13. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a plurality of material holders releasably engageable with said carrier, each of said holders comprising a container provided with a lateral extension, said carrier comprising a vertical rod and said extensions on said holders having openings through which the rod projects for holding said holders laterally of said rod with a plurality of said material holders positioned laterally of each other about said rod, said rod comprising separable parts and means for releasably securing them to each other, one of said parts being secured to said support and the other of said parts terminating in a free end when said parts are separated from each other, said free end providing for the mounting of said material holders on the carrier and the removal of said holders therefrom.

14. In immersion apparatus having a receptacle for liquid, a carrier for a plurality of holders for the material to be immersed in the liquid in said receptacle, said carrier comprising a vertical member for supporting a plurality of the material holders, and a plurality of material holders releasably engageable with said carrier, each of said holders comprising a container provided with a lateral extension, said carrier comprising a vertical rod and said extensions on said holders having openings through which the rod projects for holding said holders laterally of said rod with a plurality of said material holders positioned laterally of each other about said rod, said rod comprising separable parts and means for releasably securing them to each other, one of said parts being secured to said support and the other of said parts terminating in a free end when said parts are separated from each other, said free end providing for the mounting of said material holders on the carrier and the removal of said holders therefrom, said means for releasably securing said parts to each other comprising a sleeve slidable on said parts to a retaining position and movable to a releasing position, and means for releasably holding said spring in said retaining position.

15. In immersion apparatus having a receptacle for a processing liquid, a plurality of material holders for the material to be processed by said liquid, and a carrier for said plurality of holders, said carrier having vertically and horizontally extending parts, said vertical part having a vertically extending guide said holders having parts releasably interengageable with said vertically extending guide of said carrier and slidable relative thereto to a position in which one of said holders rests on said horizontal part of said carrier, the remaining holders being slidable relative to said carrier to rest one on top of another, whereby said carrier supports said plurality of holders in stacked relationship.

16. In immersion apparatus having a receptacle for a processing liquid, a plurality of material holders for the material to be processed by said liquid, each of said holders having a laterally extending part, and a carrier for said plurality of holders, said carrier having vertically and horizontally extending parts, said vertical part having a vertically extending guide said laterally extending parts of said holders being releasably interengageably connectable with said vertically extending guide of said carrier, said interengageable connection being so arranged that said holders are movable vertically relative to said carrier but are substantially prevented from moving laterally relative to said carrier, whereby one of said holders can be releasably connected to said vertical part of said carrier and moved vertically into engagement with the horizontal part of said carrier to position said one holder relative to said carrier and then the remaining holders can be releasably connected to said vertical part of said carrier and moved vertically to rest one on top of the other whereby said carrier supports said plurality of holders in stacked relationship.

17. In immersion apparatus having a receptacle for a processing liquid, a plurality of material holders for the material to be processed by said liquid, each of said holders having a receptacle body and a cover releasably connected to said body, said holder covers each being provided with a lateral part extending outwardly of said holder body, and a carrier for said plurality of holders, said carrier having vertically and horizontally extending parts, said vertical part having a vertically extending guide said laterally extending cover parts being releasably interengageably connectable with said vertically extending guide of said carrier, said interengageable connection being so arranged that said holders are movable vertically relative to said carrier but are substantially prevented from moving laterally relative to said carrier, whereby one of said holders can be releasably connected to said vertical part of said carrier and moved vertically into engagement with the horizontal part of said carrier to position said one holder relative to said carrier and then the remaining holders can be releasably connected to said vertical part of said carrier and moved vertically to rest one on top of the other whereby said carrier supports said plurality of holders in stacked relationship.

18. In immersion apparatus having a receptacle for liquid, a carrier for a plurality of holders for the material to be immersed in the liquid in said receptacle, said carrier comprising a vertical member having a vertically extending guide for supporting a plurality of the material holders in stacked relation, and a plurality of material holders releasably engageable with said carrier, each of said holders comprising a receptacle and a cover releasably connected to said receptacle, each of said holder having a lateral extension, said carrier and said lateral extensions of said holders having interengaging portions by which said holders are releasably secured to said carrier.

19. In immersion apparatus having a receptacle for a processing liquid, a plurality of material holders for the material to be processed by said liquid, each of said holders having a laterally extending part, said laterally extending parts having slots defined therein, said slots having wide and narrow portions, and a carrier for said holders comprising a vertical member having a vertically extending guide provided with a portion with a smaller lateral dimension than the remainder of said member, whereby said laterally extending parts can be releasably interengaged with said vertical member for mounting said holders on said carrier.

20. In immersion apparatus having a receptacle for a processing liquid, a plurality of material holders for the material to be processed by said liquid, each of said holders having a laterally extending part, said laterally extending parts having slots defined therein, said slots having wide and narrow portions, and a carrier for said holders comprising a vertical member having a vertically extending guide provided with a portion with a smaller lateral dimension than the narrow portion of said slots, the remainder of said vertical member having a lateral dimension smaller than the wide portion of said slots and larger than said narrow portion of said slots, whereby said holders can be engaged with and disengaged from said carrier only at said portion of said carrier having said small dimension.

21. In immersion apparatus having a receptacle for a processing liquid, a plurality of material holders for the material to be processed by said liquid, each of said holders having a laterally extending part, said laterally extending parts having slots defined therein, said slots having wide and narrow portions, and a carrier for said holders comprising a vertical member and a laterally extending portion adjacent the lower part of said vertical member, said vertical member having a vertically extending guide provided with a portion with a smaller lateral dimension than the narrow portion of said slots, the remainder of said vertical member having a lateral dimension smaller than the wide portion of said slots and larger than said narrow portion of said slots, whereby said holders can be engaged with and disengaged from said carrier only at said portion of said carrier having said small dimension, said holders when engaged with said vertical member being movable downwardly relative thereto whereby the bottom holder engages said laterally extending portion of said carrier and the remainder of said holders rest one on top of the other so that said carrier supports said holders in stacked relationship.

22. In immersion apparatus having a receptacle for a processing liquid, a plurality of material holders for the material to be processed by said liquid, each of said holders comprising a receptacle and a cover releasably connected to said receptacle, each of said covers having a lateral extension provided with a slot having narrow and wide portions, and a carrier for said holders comprising a vertical member having a vertically extending guide provided with a portion with a smaller lateral dimension than the narrow portion of said slots, the remainder of said vertical member having a lateral dimension smaller than the wide portion of said slots and larger than said narrow portion of said slots, whereby said holders can be engaged with and disengaged from said carrier only at said portion of said carrier having said small dimension.

23. In immersion apparatus having a receptacle for a processing liquid, a plurality of material holders for the material to be processed by said liquid, each of said holders comprising a receptacle and a cover releasably connected to said receptacle, each of said covers having a lateral extension provided with a slot having narrow and wide portions, and a carrier for said holders comprising a vertical member and a laterally extending portion adjacent the lower part of said vertical member, said vertical member having a vertically extending guide provided with a portion with a smaller lateral dimension than the narrow portion of said slots, the remainder of said vertical member having a lateral dimension smaller than the wide portion of said slots and larger than said narrow portion of said slots, whereby said holders can be engaged with and disengaged from said carrier only at said portion of said carrier having said small dimension, said holders when engaged with said vertical member being movable downwardly relative thereto whereby the bottom holder engages said laterally extending portion of said carrier and the remainder of said holders rest one on top of the other so that said carrier supports said holders in stacked relationship.

24. In immersion apparatus having a receptacle for liquid, a carrier for a plurality of holders for the material to be immersed in the liquid in said receptacle, said carrier comprising a vertical member for supporting a plurality of the material holders, and a plurality of material holders releasably engageable with said carrier, each of said holders comprising a container and a releasable cover therefor, said cover being provided with a lateral extension, said carrier comprising a vertical member provided with a vertical channel in which said extensions are movably received and by which the holders are releasably secured to said carrier with said containers projecting laterally from said channel.

25. In immersion apparatus having a receptacle for a processing liquid, a plurality of material holders for the material to be processed by said liquid, each of said holders having a laterally extending part and a carrier for said holders comprising a pair of vertically extending laterally spaced rods, said laterally extending parts of said holders having wide and narrow portions, said wide portion being greater than the spacing between said rods and said narrow portion being smaller than the spacing between said rods, whereby when the narrow portion of said lateral extensions of said holders are between said rods, said holders are movable vertically relative to said carrier but are prevented from moving laterally relative to said carrier by said rods and laterally extending portions.

26. In immersion apparatus having a receptacle for a processing liquid, a plurality of material holders for the material to be processed by said liquid, each of said holders having a laterally extending part, and a carrier for said holders comprising a lateral member and a pair of vertical rods disposed laterally of each other, said rods being accessible at the tops thereof and being secured adjacent their bottom portions to said lateral member, said laterally extending parts of said holders having wide and narrow portions, said wide portions being greater than the spacing between said rods and said narrow portion being smaller than the spacing between said rods, whereby when the narrow portions of said lateral extensions of said holders are between said rods, said holders are movable vertically relative to said carrier but are prevented from moving laterally relative to said carrier by said rods and laterally extending portions, and one of said holders can be moved downwardly onto said lateral member and the remainder of said holders can be moved downwardly one on top of the other so that said carrier supports said holders in stacked relationship.

27. In immersion apparatus having a receptacle for a processing liquid, a plurality of material holders for the material to be processed by said liquid, each of said holders comprising a receptacle and a cover releasably connected to said receptacle, each of said covers having a lateral extension, said lateral extension having wide and narrow portions, said wide portion being greater than the spacing between said rods and said narrow portion being smaller than the spacing between said rods, whereby when the narrow portion of said lateral extensions of said holders are between said rods, said holders are movable vertically relative to said carrier but are prevented from moving laterally relative to said carrier by said rods and laterally extending portions.

28. In immersion apparatus having a receptacle for a processing liquid, a plurality of material holders for the material to be processed by said liquid, each of said holders comprising a receptacle and a cover releasably connected to said receptacle, each of said covers having a lateral extension, said lateral extensions being dovetail shaped with the narrow portion adjacent the main part of said cover and the wide portion remote therefrom, and a carrier for said holders comprising a lateral member and a pair of vertical rods disposed laterally of each other.

said rods being accessible at the tops thereof and being secured adjacent their bottom portions to said lateral member, said vertical rods being spaced from each other a distance less than the width of said wide part of said lateral extensions and more than the width of the narrow part thereof, whereby when the narrow portion of said lateral extensions of said holders are between said rods, said holders are movable vertically relative to said carrier but are prevented from moving laterally relative to said carrier by said rods and laterally extending portions, and one of said holders can be moved downwardly onto said lateral member and the remainder of said holders can be moved downwardly one on top of the other so that said carrier supports said holders in stacked relationship.

29. In combination, a carrier comprising a vertical member having a vertically extending guide and a horizontal member extending laterally therefrom, and a plurality of tissue holders each comprising a member having a fibrous porous surface adapted to mount tissue thereon, said last mentioned member having a part which is releasably interengageable with said vertically extending guide of said carrier and slidable relative thereto to a position in which one of said holders operatively engages said horizontal part of said carrier and the remaining holders operatively engage one another, whereby said carrier supports said plurality of holders in stacked relationship.

References Cited in the file of this patent

UNITED STATES PATENTS

| | | |
|---|---|---|
| 1,236,832 | Frye | Aug. 14, 1917 |
| 2,157,875 | Weiskopf | May 9, 1939 |
| 2,369,592 | Marinsky et al. | Feb. 13, 1942 |
| 2,539,802 | Weiskopf | Jan. 30, 1951 |